United States Patent
Sgammato (10) Patent No.: US 6,507,581 B1
(45) Date of Patent: Jan. 14, 2003

(54) DYNAMIC PORT MODE SELECTION FOR CROSSPOINT SWITCH

(75) Inventor: Frank J. Sgammato, San Jose, CA (US)

(73) Assignee: Fairchild Semiconductor Corporation, South Portland, MA (US)

(*) Notice: Subject to any disclaimer, the term of this patent is extended or adjusted under 35 U.S.C. 154(b) by 0 days.

(21) Appl. No.: 09/097,177

(22) Filed: Jun. 12, 1998

(51) Int. Cl.$^7$ .................................................. H04Q 1/00
(52) U.S. Cl. ...................... 370/381; 370/423; 340/2.26; 710/100; 326/38
(58) Field of Search ............................... 370/381, 423, 370/392, 429; 340/2.26, 2.2, 2.21; 326/38, 41, 82, 86, 46; 710/100

(56) References Cited

U.S. PATENT DOCUMENTS

| | | | | |
|---|---|---|---|---|
| 5,282,271 A | * | 1/1994 | Hsieh et al. ................ | 340/2.26 |
| 5,428,750 A | * | 6/1995 | Hsieh et al. ................ | 710/100 |
| 5,465,056 A | * | 11/1995 | Hsieh et al. .................. | 326/38 |
| 5,710,550 A | | 1/1998 | Hsieh et al. ................ | 370/423 |
| 5,734,334 A | | 3/1998 | Hsieh et al. ................ | 370/392 |
| 6,097,211 A | * | 8/2000 | Couts-Martin et al. ....... | 326/46 |
| 6,259,271 B1 | * | 7/2001 | Couts-Martin et al. ....... | 326/41 |

* cited by examiner

Primary Examiner—Brian Zimmerman
(74) Attorney, Agent, or Firm—Daniel J. Bedell; Smith-Hill and Bedell (57) ABSTRACT

A crosspoint switch includes a large number of ports and a separate pass transistor linking each possible pair of ports. When a pass transistor is turned on or off, it makes or breaks a signal path between the pair of ports it links. Each port can process signals passing through the port in any one of several operating modes, with a current operating mode being selected by input mode control data. The crosspoint switch also includes a random access memory (RAM) having a separate addressable storage location corresponding to each port. Each RAM storage location stores routing data for controlling the pass transistors connected to a corresponding port and also stores mode control data controlling the mode of the corresponding port. A memory controller responds to a parallel command from a host computer by concurrently writing routing and mode control data to two storage location of the RAM, thereby quickly making and/or breaking a signal path between two ports and selecting the operating mode of both ports.

14 Claims, 4 Drawing Sheets

DYNAMIC PORT MODE SELECTION FOR CROSSPOINT SWITCH

BACKGROUND OF THE INVENTION

Field of the Invention

The present invention relates in general to crosspoint switch ports and in particular to a crosspoint switch permitting dynamic port operating mode selection.

DESCRIPTION OF RELATED ART

U.S. Pat. No. 5,710,550 entitled "Apparatus for Programmable Signal Switching" issued Jan. 20, 1998 to Hsieh et al ('550), describes a crossbar (or crosspoint) switch having a set of input/output (I/O) terminals interconnected by an array of pass transistors, one for each possible pair of I/O terminals. Each pass transistor links the corresponding pair of I/O terminals so that when the transistor is turned on, it provides a bidirectional signal path between those two I/O terminals. The crosspoint switch also includes a random access memory (RAM) storing a data word corresponding to each I/O terminal. Each bit of the data word controls the on/off state of a pass transistor linking that I/O terminal to some other I/O terminal. An external host computer can make or break routing paths by writing data to various RAM addresses. A serial bus links the host computer to a memory controller. When the host computer sends routing control data and a RAM address to the memory controller via the serial bus, the memory controller writes that data to the routing control RAM, thereby making and/or breaking routing paths to the switch port corresponding to that address.

When a crosspoint switch is used in some high speed applications, it is important that host computer be able to quickly command the crosspoint switch to make or break a routing path. To specify a routing path change, the host computer must send a relatively large amount of data over the serial bus. It therefore takes a relatively long time for a routing path change to occur once the host computer decides it wants to make the path change. To speed up routing data transfer, Hsieh's system includes a parallel bus linking the host computer to the memory controller. The parallel bus is made wide enough to convey all of the information the memory controller needs to write a word to the RAM controlling routing paths through the crosspoint switch. This system therefore enables the host computer to command a routing change in one parallel bus data cycle. However since the width of the parallel bus is proportional to the number of switch terminals, the required parallel bus width becomes impractically large as the number of switch terminals increases.

A crosspoint switch is useful for selectively routing both digital and analog signals between lines or buses connected to its terminals. However since a pass transistor can degrade a digital signal, it is helpful to provide a port at each I/O terminal that can buffer a signal before it enters the switch at that terminal or after it departs the switch from the terminal. U.S. Pat. No. 5,734,334 entitled "Programmable Port for Crossbar Switch" issued Mar. 31, 1998 to Hsieh et al ('334) describes a crossbar (crosspoint) switch having a port at each of its terminals. Each port may operate in either an analog mode or in any one of several digital modes depending on the type of signal being routed through the crosspoint switch. In its analog mode the port simply passes an analog signal entering or leaving the crosspoint switch terminal without buffering it. In all digital modes the port buffers any digital signal entering or leaving the switch terminal. In a digital bidirectional mode, the port buffers digital signals both entering and leaving the port terminal. In a unidirectional input mode, the port buffers signals entering the terminal and blocks signals leaving the terminal. Conversely, in a unidirectional output mode, the port buffers signals leaving the terminal but block signals arriving at the terminal. The port also has tristate bidirectional and unidirectional mode in which signals are buffered only when an externally generated tristate control signal is asserted. A set of tristate control lines are provided in parallel to each port and each port may be programmed to select any one of those lines as its tristate control input. A host computer can change the operating mode of any port or select its source of tristate control signal by transmitting programming data to that port through a serial bus linking the host computer to all switch ports. That same serial bus also delivers routing data from the host computer to the memory controller for the routing control RAM.

In some high speed applications, it would be beneficial if the host computer could not only quickly make or break a routing path between two ports but also to quickly change the operating modes of the two ports. However, in the system described by the '334 patent, since the host computer must transmit the routing control data and the port mode control data over the same serial bus, the operation cannot be carried out quickly. Even when the number of switch terminals is small enough that it is practical to send routing control data via a parallel bus as taught by the '550 patent, the time the host requires to transmit mode control data to the two ports involved in a routing change extends the overall time needed to carry out that routing change.

What is needed is a crosspoint switch having a large number of ports with selectable operating modes that allows a host computer to quickly change both a routing path between any two ports as well as the operating modes of the two ports.

SUMMARY OF THE INVENTION

A crosspoint switch in accordance with the present invention includes a large number of input/output (I/O) terminals and a separate pass transistor linking each possible pair of I/O terminals. When a pass transistor is turned on, it provides a signal path between the pair of I/O terminals it links. The crosspoint switch also includes a separate port connected to each I/O terminal for buffering a signal before it enters or after it leaves an I/O terminal. Each port can operate in one of several operating modes, with a current mode of operation selected by mode control data. The crosspoint switch also includes a random access memory (RAM) having a separate addressable storage location corresponding to each I/O.

In accordance with one aspect of the invention each RAM storage location stores routing data for controlling the pass transistors connected to a corresponding switch I/O terminal and also stores mode control data controlling the mode of the port connected to that I/O terminal.

In accordance with another aspect of the invention, the crosspoint switch also includes a memory controller for concurrently writing routing and mode control data to a storage location of the RAM. Thus by writing data to one RAM storage location, the memory controller can make and/or break signal paths between a selected switch I/O terminal and one or more other switch I/O terminals and, at the same time, can select the operating mode of the selected switch I/O terminal.

In accordance with a further aspect of the invention, the memory controller includes an input for receiving a parallel data command from a host computer. That parallel data command contains information referencing two I/O terminals, indicates whether a connection between the two I/O terminals is to be made or broken and indicates an operating mode for the ports connected to those two terminals. The memory controller responds to the command by writing data to the RAM locations corresponding to the two I/O terminals. That data causes the switch to make or break the connection and select the operating modes of the two ports as indicated by the command.

In accordance with yet another aspect of the invention, the memory controller decodes the command to determine what two RAM storage locations are to receive data and to determine what data is to be written to those two storage locations. A parallel command having a relatively small number of bits tells the memory controller to write a relatively large amount of data to the RAM. The manner in which the memory controller decodes the command is controlled by programming data from the host computer.

It is accordingly an object of the invention to provide a crosspoint switch having a large number of ports with selectable operating modes that allows a host computer to quickly change both the routing path between any two ports as well as the operating modes of the two ports by sending the switch a relatively small amount of data.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENT(S)

Figure 1:
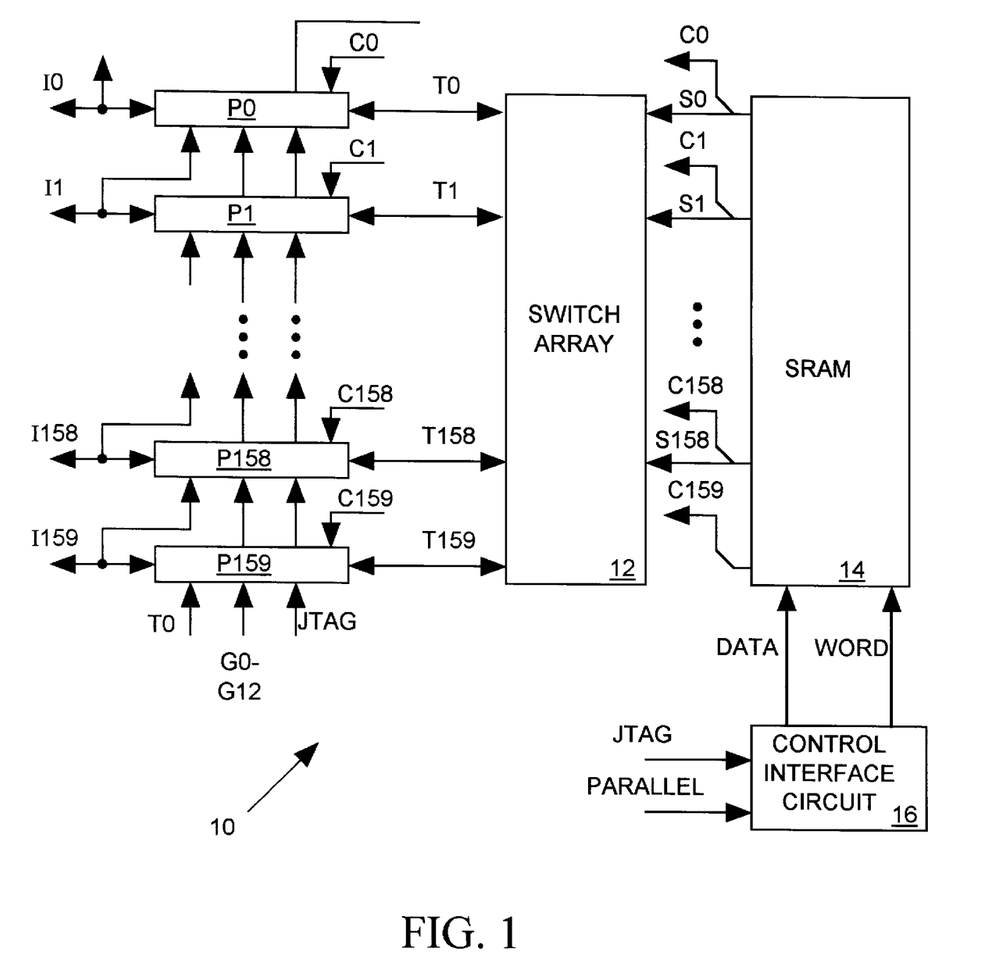
FIG. 1 illustrates in block diagram form a crossbar switch in accordance with the present invention.

FIG. 1 illustrates in block diagram form a programmable crossbar switch 10 in accordance with the present invention. Crossbar switch 10 includes a set of 160 programmable ports P0–P159, a switch array 12, a static random access memory 14, and a control interface circuit 16. Each port P0–P159 provides a buffered digital data signal path or an unbuffered analog signal path between an I/O terminal I0–I159 and a corresponding terminal T0–T159 of switch array 12. A set of 13 tristate control signal inputs G0–G12 are supplied in parallel to each port P0–P159 in a manner described herein below.

Switch array 12 is a triangular array of switch elements for selectively routing digital or analog data signals between pairs of its terminals T0–T159. In the preferred embodiment each switch element is a pass transistor having source and drain terminals connected to a pair of terminals T0–T159. Switch array 12 can route digital or analog signals between any two terminals T0–T159 when a control signal supplied to the gate of the pass transistor connected to those terminals turns on the pass transistor, thereby allowing it to provide a signal path between the two terminals. Switch 12 is "non-blocking" in that only one pass transistor needs to be turned on in order to make a connection between any two ports and a connection between any two terminals can always be established regardless of the state of other connections provided by the switch. In other words, the switch array 12 can make or break a connection between any two of terminals T0–T159 without affecting any other connection. A generally similar switch array is described in U.S. Pat. No. 5,282,271 titled I/O BUFFERING SYSTEM TO A PROGRAMMABLE SWITCHING APPARATUS issued Jan. 25, 1994 to Wen-Jai Hsieh et al, incorporated herein by reference.

A set of 159 routing control data fields S0–S158 are stored at successive addresses 0–159 of SRAM 14. Each bit of each field S0–S159 controls the gate of a separate pass transistor in switch array 12. Words S0 to S159 vary in size from 1 to 159 bits. In particular, for a given integer value of x ranging from 0 to 159, each routing control data field Sx has 159-x bits. For example field S0 has 159 bits, each bit corresponding to a separate one of terminals T1–T159 and controlling the gate of a pass transistor interconnecting terminal T0 to a separate one of terminals T1–T159. Word S1 has 160 bits, each bit controlling the gate of a pass transistor interconnecting terminal T1 to a separate one of terminals T2–T159. Field Si does not require a bit to control the pass transistor linking terminal T1 to terminal T0 because a bit for that purpose is included in field S0. An additional field S159 is not required to control pass transistors connecting terminal T159 to other terminals T0–T158 since bits having that function are included in fields S0–S158.

Each port P0–P159 may be programmed to operate in any of many operating modes as described below depending on the nature and direction of the signals served by the port. In accordance with the invention, a set of port mode control data fields C0–C159 are also stored at successive addresses 0–159 of SRAM 14. Each data field Cx is applied as input to a corresponding port Px to select its mode of operation. If each port Px has $2_N$ different operating modes, we could choose the number of bits of the Cx field to be N so that the Cx data can choose any one of the $2_N$ possible port operating modes. However, since only a limited number of operating modes are likely to be used in any particular application, we reduce the size of the Cx field, for example, to two bits by allowing a host computer to program each port P0–P159 to assign four of its many operating modes to the four possible values of the 2-bit Cx data field.

Suppose for example we want crosspoint switch 10 to route an input digital data signal arriving at terminal I0 through port P0 and switch array 12 to port P158 and then outward from terminal I158. Suppose also that we want each port P0 and P158 to buffer the data signal as it passes through and that we also want port P158 to act as a tristate buffer so that it tristates terminal I158 in response to an input tristate control signal. A set of 13 control lines G0–G12 provides inputs to each port P0–P159. When operating in a tristate mode, each port P0–P159 can use an externally generated signal appearing on any one of lines G0–G13 as a tristate control signal. Each port Px other than port P159 also receives the signal appearing on I/O terminal I(x+1) line and can be programmed to use that signal as a tristate control signal. (Port P159 may use a signal appearing on the I0 line as a tristate control signal.)

To program crosspoint switch 10, port P0 must first be programmed to enter into a mode in which it buffers a digital input signal arriving at terminal I0 onto switch array 12 terminal T0 in response to a particular value of its input mode control data C0. Port P158 must be initially programmed to enter into a tristate operating mode in which it responds to a particular value of mode control data C158 by buffering data arriving at terminal T159 onto terminal I158 when, for example, the G0 signal is asserted and otherwise tristates the I158 terminal when G0 is not asserted. Appropriate (S0,C0) and (S158, C158) data words must then be written into addresses 0 and 158 of SRAM 14. The S0 field establishes connection through switch array 12 between terminals T0 and T158, and the S158 field breaks any other existing connections to terminal T158. The C0 and C158 fields set ports P0 and P158 to the desired operating modes.

SRAM 14 is a static random access memory having 160 addressable storage locations, each for storing a data word including a 0 to 159 bit routing data field Sx and a 2-bit port mode control field Cx. SRAM 14, accessed via a 162-bit parallel data bus (DATA) and a 160 word select bus (WORD), replaces one of its stored data words (Sx, Cx) with a word appearing on the DATA bus whenever one of the WORD lines is asserted. The particular WORD line being asserted indicates the SRAM address to which the word on the DATA bus is to be written.

To initially program switch 10, an external host controller sends a serial data sequence to control interface circuit 16 via an IEEE standard JTAG serial bus. The data sequence includes a data word (Sx, Cx) for each address of SRAM 14, programming data to be supplied to each port P0–P159 and other programming data as described below. Control interface circuit 16 sequentially places the incoming (Sx, Cx) words on the DATA bus input to SRAM 14 and strobes each WORD bus line in succession to write each incoming (Sx, Cx) data word to a separate SRAM 14 address. As described below, control interface circuit 16 also internally stores some of the serial data arriving on the JTAG bus for guiding its own behavior thereafter After the host computer initially programs switch 10 by sending data transferred to control interface circuit 16 via the JTAG bus, it may at any time thereafter make or break a connection between a pair of ports P0–P159 and set their operating modes by sending a single command to control interface circuit 16 via a conventional parallel data bus (PARALLEL). The command is an 8-bit data word that is encoded to identify the two ports, to indicate whether a connection between the two ports is to be made or broken, and to indicate the values of the port operating mode fields Cx to be supplied to the two ports. Upon receiving the command, control interface circuit 16 writes appropriate (Sx, Cx) words to the two addresses of SRAM 14 that correspond to the two ports. For example if port P0 is to be connected to port P158, control interface circuit 16 writes a word to address 0 of SRAM 14 establishing the connection between ports P0 and P158 through switch array 12 and also appropriately setting the operating mode of port P0. Control interface circuit 16 then writes a word to address 158 of SRAM 14 breaking any other connection to port P158 and appropriately setting the operating mode of port P158.

The host computer can therefore not only make or break a connection between any two ports P0–P159 in one write cycle of the PARALLEL bus, it can also set the operating mode of both ports. Since there are 12,720 possible pairs of ports P0–P159, the command conveyed on the PARALLEL bus could use 14 bits to identify one of 12,720 port pairs along with one additional bit to indicate whether the connection between the port pairs is to be made or broken. Since the command conveyed on the PARALLEL bus must identify the two 2-bit Cx values (one for each of the two ports), the command could use a total of 18 bits in order to tell control interface circuit 16 to make or break a connection between two particular ports and to set the Cx field inputs to the two ports.

However in the preferred embodiment of the invention, the command is reduced to eight bits to limit the size of the PARALLEL bus that conveys it. Of course an 8-bit command can have only one of 256 different values, and is therefore not large enough to select any one of the large number make/break/mode select combinations that would be needed to make full use of the routing and port mode capability of switch 10. But in accordance with the invention, the additional programming data supplied to control interface circuit 16 via the JTAG bus tells it how to set the value of data in SRAM 14 in response to each possible value of the 8-bit command arriving on the PARALLEL bus. As long as a data routing application employing switch 10 requires no more than 256 different switch control combinations, the 8-bit command width limitation does not prevent switch 10 from carrying out the application's data routing needs.

Figure 2:
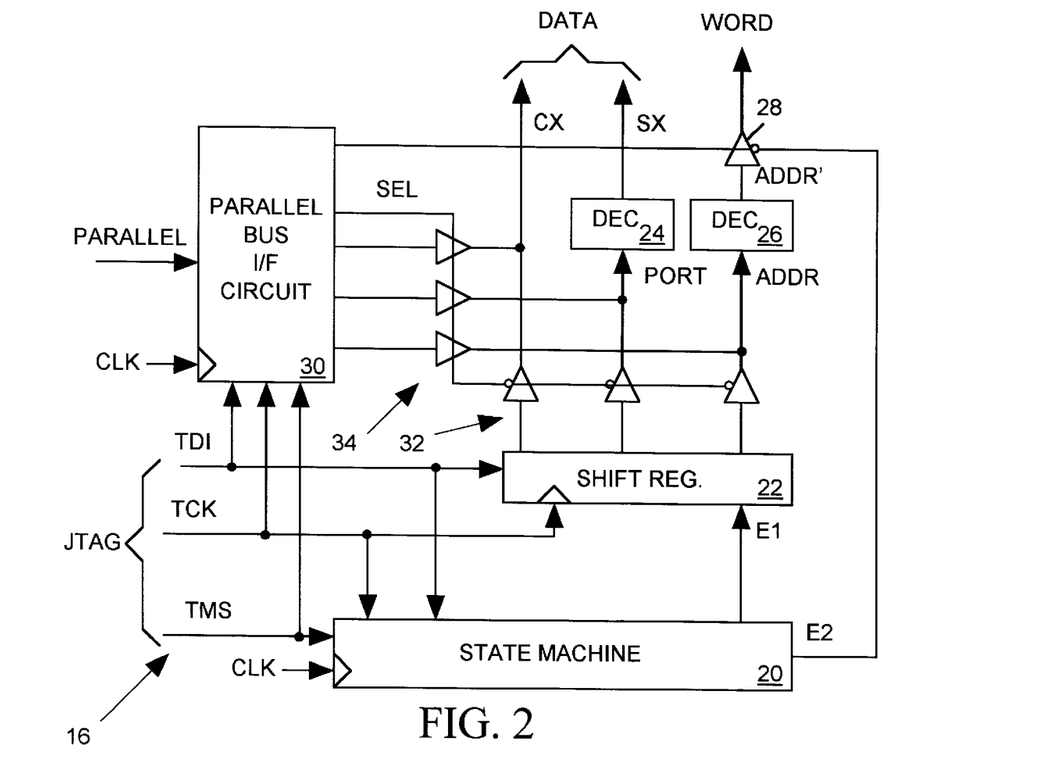
FIG. 2 illustrates the control interface circuit of FIG. 1 in more detailed block diagram form.

FIG. 2 illustrates control interface circuit 16 in more detailed block diagram form. The JTAG bus includes three lines TDI, TCK, and TMS. The TDI line carries data in serial form and the TCK line carries a clock signal. The host computer pulses the TMS line to indicate that it is about to transmit an instruction code on the TDI line. To write data into SRAM 14 of FIG. 1, a host computer first sends a pulse on the TMS line to tell a state machine 20 that an instruction is to follow on the TDI line. The host computer then sends a short serial "SRAM load" code to state machine 20 via the TDI line using the TCK line to clock each bit. State machine 20, programmed to respond to that code and clocked by a high frequency clock signal CLK, sends an input enable signal E1 to a serial-in/parallel-out shift register 22. Thereafter, on each pulse of the TCK clock signal from the host computer, shift register 22 shifts in a bit of a data sequence the host computer sends to shift register 22 via the TDI line. The data sequence includes an 8-bit ADDR field referencing the address of SRAM 14 (FIG. 1) at which data is to be written, an 8-bit PORT field Sx and a 2-bit port mode control field Cx. State machine 20 counts pulses of the TCK signal and when it determines that all bits of the sequence have been stored in shift register 22, state machine 20 turns off the E1 enable signal. A decoder 24 decodes the 8-bit PORT field in shift register 22 to produce the 160-bit Sx field. Decoder 24 sets all bits but one bit of the Sx field low when a connection is to be established between a switch port corresponding to the SRAM address and another port identified by the PORT field. The value of the PORT field tells decoder 24 which bit (0 to 159) of the Sx field to set high. When the PORT field has a value of 160, decoder 24 sets all bits of the Sx field low to that the port corresponding to the SRAM address is disconnected from all other ports. The 160 Sx output data bits of decoder 24 and the two Cx data bits stored in shift register 22 are placed on the DATA line inputs to SRAM 14 of FIG. 1. A decoder 26 decodes the 8-bit ADDR field stored in shift register 22 to produce a 160-bit output ADDR' field having one bit set high. A tristate buffer 28, when enabled, links the ADDR' field to the 160-line WORD select bus input to SRAM 14. After state machine 20 turns off the E1 signal, it pulses a signal E2 briefly enabling tristate buffer 28 to send a pulse on one of the WORD lines, thereby writing the Cx and Sx data to the SRAM 14 address identified by the ADDR field. The host computer repeats this process 160 times when initially programming switch 10 to load data into all 160 addresses of SRAM 14. Thereafter the host computer can repeat the process whenever it wants to change the data at any address of SRAM 14.

Control interface circuit 16 of FIG. 2 also includes a parallel bus interface circuit 30 that allows the host computer to use the PARALLEL bus to quickly write data to SRAM 14. Normally a set of tristate buffers 32 deliver the data stored in shift register 22 to decoders 24 and 26 and to the Cx lines of the DATA bus. However when the host computer sends a command via the PARALLEL bus, interface circuit 30 tristates buffers 32 and enables another set of tristate buffers 34 to couple its own Cx, PORT, and ADDR output fields to the Cx lines of the DATA bus and to decoders 24 and 26. Each command arriving on the PARALLEL bus tells interface circuit 30 to make or break a connection by writing data to the two SRAM 14 addresses corresponding to the two ports to be connected or disconnected. After receiving a command on the PARALLEL bus, interface circuit 30 generates the Cx, PORT and ADDR data for the first SRAM write operation and then pulses the E2 signal to enable tristate buffer 28, thereby writing the data to SRAM 14. Interface circuit 30 then produces the Cx, PORT and ADDR data for the second SRAM write operation and again pulses the E2 signal to initiate the second SRAM write operation.

Figure 3:
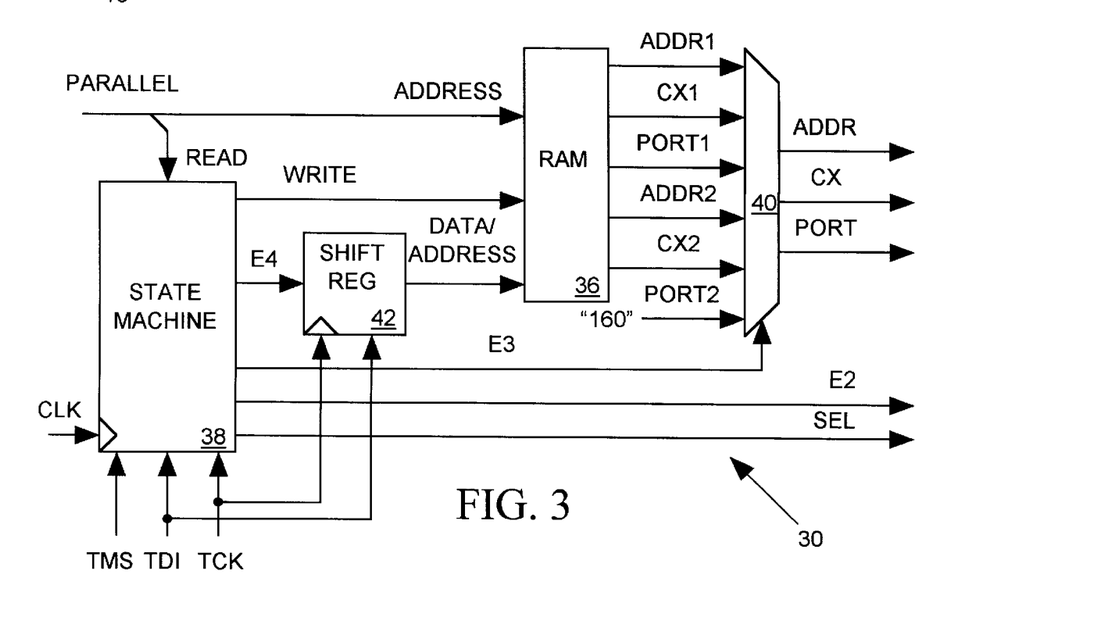
FIG. 3 illustrates the parallel bus interface circuit of FIG. 2 in more detailed block diagram form.

FIG. 3 illustrates parallel bus interface circuit 30 of FIG. 2 in more detailed block diagram form. A command arriving on the PARALLEL bus includes an 8-bit ADDRESS field applied to a random access memory (RAM) 36 and a READ bit supplied to a state machine 38. At each of its 256 addressable storage locations RAM 36 stores 8-bit ADDR1 and ADDR2 fields, an 8-bit PORT1 field and 2-bit Cx1 and CX2 fields. When the host sends a command via the PARALLEL bus, RAM 36 reads out data stored at the address indicated the ADDRESS field. The read-out data, along with a hard-wired PORT2 field having a value of 160, are supplied to a multiplexer 40 controlled by an output signal E3 produced by state machine 38. The READ bit in the command conveyed on the PARALLEL bus tells state machine 38 to set multiplexer 40 so that it initially selects and provides the read out ADDR1, PORT1 and CX1 fields as the ADDR, PORT and CX field outputs of interface circuit 30. State machine 30 also sets the SEL signal so that buffers 34 of FIG. 2 forward that data to decoders 24 and 26 and the CX lines of the DATA bus. State machine 38 then pulses the E2 control input to buffer 28 to write data to the a first address of SRAM 14. State machine 38 then switches multiplexer 40 so that it selects its input ADDR2, CX2 and PORT2 fields as the sources of its output ADDR, CX and PORT fields, and then pulses the E2 once again to write data to the second SRAM 14 address.

The host computer may use the JTAG bus to change the data stored in any location of RAM 36. This changes how any particular ADDRESS value the host computer supplies on the PARALLEL bus alters connections between switch ports P0–P159 and sets their operating modes. The TMS, TDI and TCK lines of the JTAG bus provide inputs to state machine 38. When the host computer pulses the TMS line and sends a code over the TDI line indicating that data is to be loaded into RAM 36, state machine 38 asserts a signal E4 to enable a serial-in/parallel-out shift register 42. Thereafter the host computer sends a data sequence over the TDI line to shift register 42 using the TCK signal to shift each bit into register 42. The data sequence includes data to be written to RAM 36 and the address to which it is to be written. State machine 38 counts pulses of the TCK signal to determine when the data and address fields have been loaded into register 42. At that point state machine 38 deasserts the E4 signal and pulses a WRITE signal input to RAM 36 causing it to store the data field output of register 42 at the indicated address.

Figure 4:
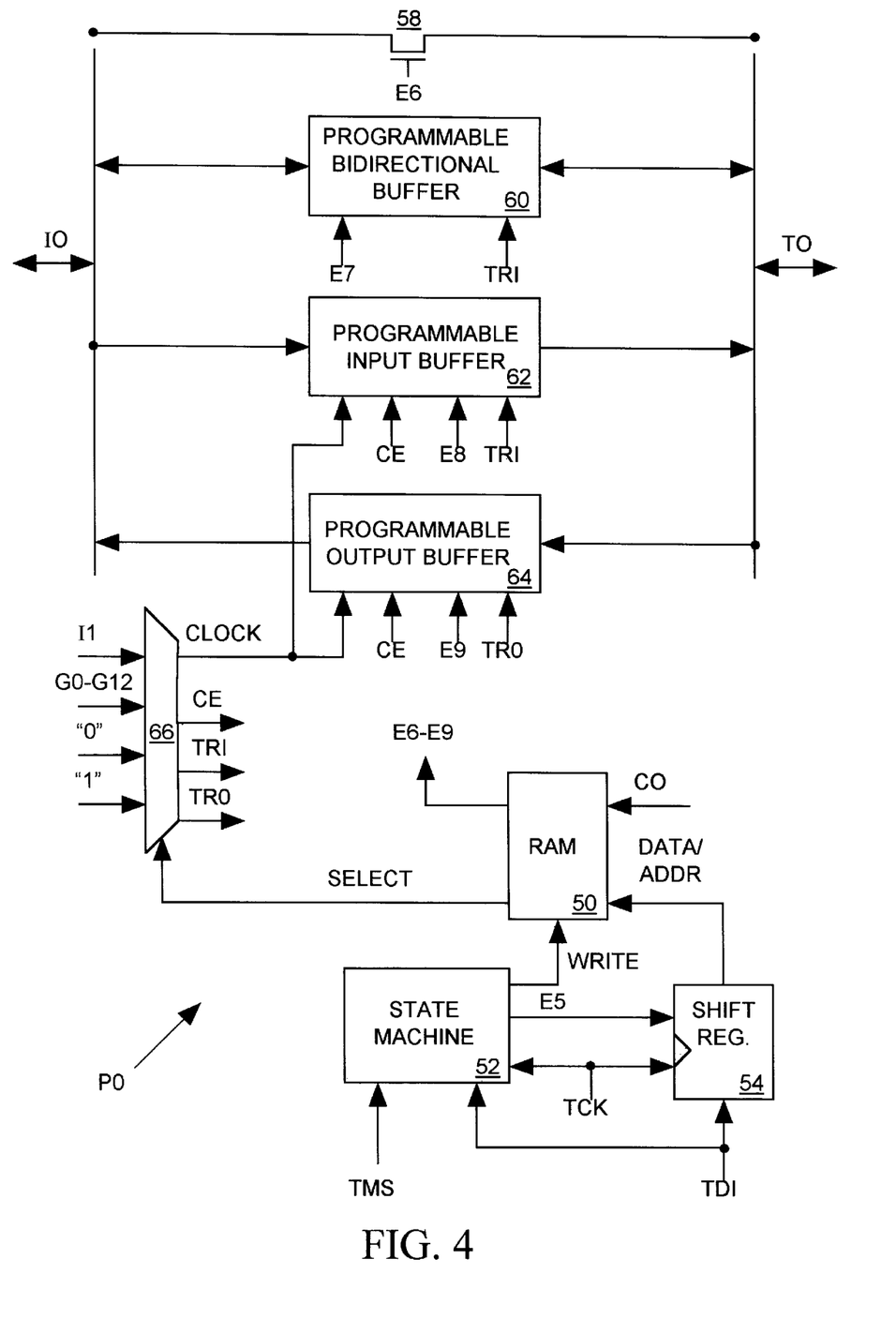
FIG. 4 illustrates port P0 of FIG. 1 in more detailed block diagram form.

FIG. 4 illustrates port P0 of FIG. 1 in more detailed block diagram form. Ports P1–P159 are similar. Port P0 can operate in any one of several operating modes. The current 2-bit C0 field output of SRAM 14 of FIG. 1 read addresses a RAM 50 having four addressable storage locations. Data stored at currently addressed RAM 50 location selects the operating mode of port P0. Thus the 2-bit C0 field can select any one of four port operating modes. A host computer may use the JTAG bus to write data to each address of RAM 50 thereby determining which four of the many possible operating modes are available for selection by the incoming C0 field. To write data to an address of RAM 50 a host computer sends a TMS signal pulse to a state machine 52 and then sends a code to state machine 52 via the TDI line telling it that data is to be written to the RAM 50 of port P0. (The state machine 52 in each port P0–P159 responds to a different code so that the host may independently write data to the RAM 50 in each port.) State machine 52 responds to the code by asserting an enable signal E5 input of a serial-in/parallel-out shift register 54. The host then loads a data sequence into register 54 including data to be written to RAM 50 and the RAM address to receive it. State machine 52 counts pulses of the TCK signal that clocks the data sequence into shift register 54 and, when the data sequence is fully loaded into register 54, state machine 52 turns off the E5 signal and sends a WRITE pulse causing RAM 50 to store the data at the indicated address.

Port P0 has four major paths for routing signals between its I0 and T0 ports. The mode control data output RAM 50 read out in response the incoming C0 field may activate one of those signal paths and chooses operating characteristics of the activated path. The four paths are separately discussed below.

Analog Path

When turned on by a control bit output E6 of RAM 50, a pass transistor 58 provides an unbuffered analog signal path between terminals I0 and T0.

Bi-directional Digital Signal Path

When placed in an active mode by a multiple bit output field E7 of RAM 50, a programmable buffer 60 provides a digital signal path between the two terminals I0 and T0. Buffer 60 has several operating modes, one of which is chosen by the value of the E7 data field. For example, in a bidirectional mode of operation, buffer 60 normally weakly pulls the I0 and T0 terminals to a high logic level. However if any external device connected to terminal I0 pulls terminal I0 to a low logic level, buffer 60 pulls terminal T0 to the low logic level and holds it there until the I0 terminal is driven high again. Conversely, if switch array 12 routes a low logic level signal to terminal T0, buffer 60 pulls terminal I0 to the low logic level and holds it there until the signal at terminal T0 goes high again. Thus buffer 60 passes digital signals in either direction without requiring an external direction control signal. In a bidirectional tristate mode of operation, buffer 60 passes signals in either direction between the I0 and T0 terminals but only when an input tristate control signal TRI is asserted. When the TRI signal is deasserted, buffer 60 tristates both terminals. In other modes of operation that may be selected by the E7 data, buffer 60 may force either of its outputs to a high or low logic level, or may act as a unidirectional buffer with or without tristate control. Buffer 60 is described in detail in U.S. Pat. No. 5,426,738 entitled "Apparatus for Flexibly Routing Signals Between Pins of Electronic Devices" issued Jun. 20, 1995 to Hsieh et al and incorporated herein by reference.

Uni-directional Input and Output Paths

Port P0 also includes programmable, unidirectional input and output buffers 62 and 64. Input buffer 62 buffers a switch input signal arriving on terminal I0 onto terminal T0. Buffer 64 buffers a switch output signal arriving at terminal T0 onto terminal I0. Each buffer 62 has several modes of operation. A multiple bit output field E8 from RAM 50 selects the operating mode of buffer 62 while the multiple bit output field E9 of RAM 50 selects the operating mode of buffer 64. When operating in a tristate mode, either buffer 62 or 64 may provide a tristate output signals respectively under control of tristate control signals TRI and TRO. When operating in a synchronous latching mode buffers 62 and 64 latch input signals onto their output terminals in response to input clock (CLOCK) and clock enable (CE) signals. The nature and operation of buffers 62 and 64 is discussed in detail in U.S. Pat. No. 5,734,334 entitled "Programmable Port for Crossbar Switch" issued Mar. 31, 1998 to Hsieh et al and incorporated herein by reference.

Control Signal Selection

A set of control lines G0–G12, the I1 terminal, and hardwired logical "1" and "0" bits provide inputs to a multiplexer 66. Multiplexer 66, under control of a SELECT data field output of RAM 50, chooses from among its inputs to provide the CLOCK, CE, TRI, and TRO inputs to buffers 60, 62, and 64. Thus, for example, an external device connected to the I1 port or to any of the G0–G12 lines can supply any one of the CLOCK, CE, TRI or TRO signals. The C0 data may also control the state of any one of the TRI, TRO or CE control signals by casing multiplexer 66 to select its logical 0 or 1 input as the control signal source.

Thus as described herein above, crosspoint switch 10 includes a switch array 12 controlled by data in SRAM 14 for routing signals between a set of I/O ports P0–P159. In accordance with the invention, the data words stored in SRAM 14 that select routing paths through switch array 12 also select a mode of operation of each interconnected port. Accordingly, when an external host commands control interface circuit 16 to write data to SRAM 14 to establish a routing path through switch array 12, that data also sets the operating mode of the two ports at either end of the routing path in accordance with the nature of the signal to be routed through that path. Thus crosspoint switch 10 can quickly establish a routing connection between any two ports, it can with no additional delay also change the operating mode of the ports if necessary to suit the signal to be routed.

System Expansion

Figure 5:
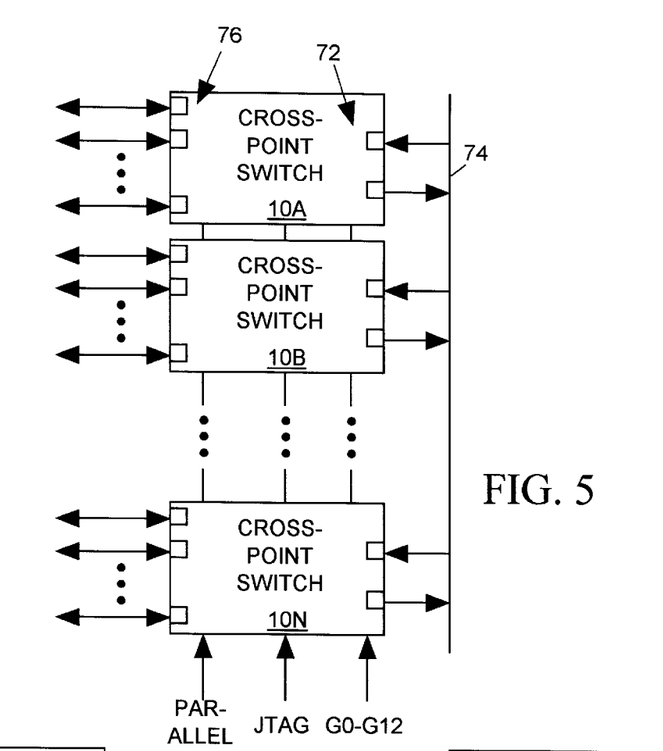
FIGS. 5 and 6 illustrate in block diagram form switching networks formed by interconnecting multiple crossbar switches.

Several crosspoint switches can be interconnected in various ways to provide a larger signal routing system. For example, as illustrated in FIG. 5, two ports 72 of each of a set of N crosspoint switches 10A–10N is connected to a parallel bus 74. This allows devices connected to other ports 76 of each switch 10A–10N to communicate with each other even though they may not be connected to the same crosspoint switch. One port 72 of each switch 10A–10N is set to operate in a unidirectional input mode while the other port 72 of all switches 10A–10N is set to operate in a unidirectional, tristate output mode. One could alternatively set all ports 72 in bidirectional operating modes.

Figure 6:
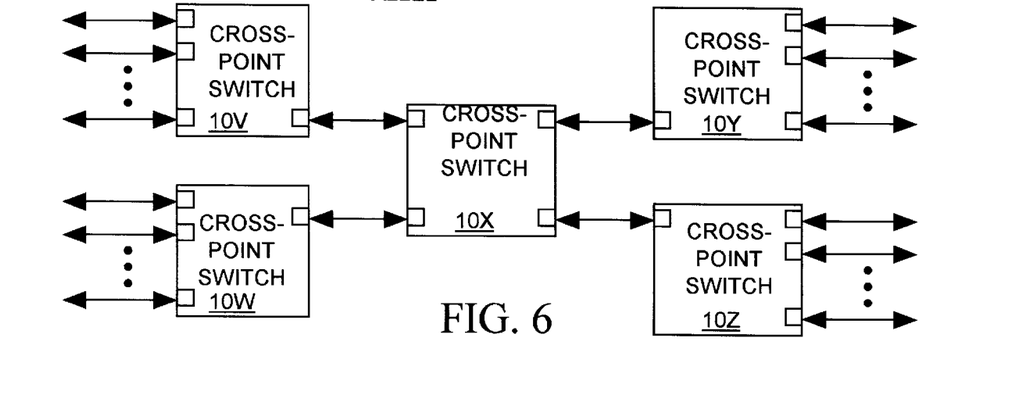

FIG. 6 illustrates five crosspoint switches 10V–10Z with ports of switch 10X linked to ports of the other switches so that switch 10X may route transmissions between the other switches. Since switch 10X has operating ports that can quickly change from one operating mode to another, the ports needed not be dedicated to routing any one particular type of signal traffic. Therefore when the other cross point switches communicate with one another in various modes, the routing resources of switch 10X can be efficiently allocated.

While the forgoing specification has described preferred embodiment(s) of the present invention, one skilled in the art may make many modifications to the preferred embodiment without departing form the invention in its broader aspects. The appended claims therefore are intended to cover all such modifications as fall within the true scope and spirit of the invention.

What is claimed is:

1. A crosspoint switch comprising:
    a plurality of ports, each comprising first and second terminals and means for processing an input signal arriving at either of said first and second terminals in any of a plurality of operating modes to produce an output signal at another of said first and second terminals, wherein mode control data supplied to each port sets the port to operate in one of said operating modes;
    a plurality of switch elements, each switch element being connected to second terminals of a separate pair of said ports, each switch element receiving input routing control data indicating whether a signal path between said second terminals of said separate pair of ports is to be made or broken, and said switch element making and breaking said signal path in response to said input routing control data; and
    memory means having a plurality of addressable storage locations, each storage location corresponding to a separate one of said ports, each storage location storing and supplying routing control data as input to at least one switch element connected to the second terminal of the storage location's corresponding port and storing and supplying mode control data as input to the corresponding port.

2. The crosspoint switch in accordance with claim 1 further comprising means for concurrently writing routing control data and mode control data to a storage location of said memory means.

3. The crosspoint switch in accordance with claim 1 further comprising:
    a bus for conveying a command referencing a pair of said switch ports, said pair of switch ports consisting of a first switch port and a second switch port, wherein said command also references one of said plurality of operating modes to which said first switch port is to be set; and
    memory controller means connected to said bus for receiving and responding to said command by concurrently writing first routing control data and first mode control data to a first storage location of said memory means corresponding to said first switch port.

4. The crosspoint switch in accordance with claim 3 wherein said command also indicates one of said operating mode to which said second switch port is to be set and wherein said memory controller means also responds to said command by writing second routing control data and second mode control data to a second storage location of said memory means corresponding to said second switch port.

5. The crosspoint switch in accordance with claim 3 wherein said command consists of a plurality of bits and wherein said bus is a parallel bus that concurrently conveys all bits of said command.

6. The crosspoint switch in accordance with claim 1 further comprising:

a bus for conveying a command;

memory controller means for receiving and decoding said command to generate a first address, first routing data and first mode control data, and for writing said first routing data and said first mode control data to said first addressable storage location of said memory means.

7. The crosspoint switch in accordance with claim 6 wherein values of said first address, said first routing data and said first mode control data said memory controller generates when decoding said command are determined by programming data provided as input to said memory controller.

8. The crosspoint switch in accordance with claim 6 wherein said memory controller means also decodes said command to generate a second address and second mode control data and writes said second mode control data to said second address of said memory means.

9. The crosspoint switch in accordance with claim 8 wherein values of said first address, said first routing data, said first mode control data and said second mode control data said memory controller generates when decoding said command are determined by programming data provided as input to said memory controller.

10. The crosspoint switch in accordance with claim 1 wherein each of said ports comprises:

said first and second terminals;

first unidirectional buffer means connected between said first and second terminals for buffering a signal supplied as input to said first terminal onto said second terminal when enabled by first enable data supplied as input thereto;

second unidirectional buffer means connected between said first and second terminals for buffering a signal received as input to said second terminal onto said first terminal when enabled by a second enable data supplied as input thereto; and means for decoding said mode control data to generate said first and second enable data.

11. The crosspoint switch in accordance with claim 10 wherein each of said ports further comprises means for buffering a bidirectional signal passing between said first and second terminals when enabled by a third enable data, and wherein said means for decoding also decodes said mode control data to generate said third enable data.

12. The crosspoint switch in accordance with claim 1 wherein each of said ports comprises:

first tristate buffer means for buffering a signal arriving at said first terminal onto said second terminal when enabled by input first enable data and an input first tristate control signal, second tristate buffer means for buffering a signal arriving at said second terminal onto said first terminal when enabled by input second enable data and an input second tristate control signal, and means for decoding said mode control data to generate said first and second enable data.

13. The crosspoint switch port in accordance with claim 12 further comprising a plurality of control lines for carrying control signals, wherein each of said ports comprises multiplexing means for receiving the control signals conveyed on said plurality of tristate control lines, for responding to input selection control data by selecting and applying one of said control signals to said first tristate buffer means as said first tristate control signal and by selecting and applying another of said control signals to said second tristate buffer means as said second tristate control signal.

14. The crosspoint port in accordance with claim 13 wherein said means for decoding also decodes said mode control data to generate said selection control data input to said multiplexing means.

* * * * *